United States Patent
Palaniappan et al.

(10) Patent No.: US 7,014,808 B2
(45) Date of Patent: Mar. 21, 2006

(54) METHOD AND APPARATUS FOR COATING THE INTERIOR SURFACE OF A STRAW

(75) Inventors: Sevugan Palaniappan, Sugar Land, TX (US); Shengying Zhou, Apopka, FL (US); You Lung Chen, Altamonte Springs, FL (US)

(73) Assignee: The Coca-Cola Company, Atlanta, GA (US)

(*) Notice: Subject to any disclaimer, the term of this patent is extended or adjusted under 35 U.S.C. 154(b) by 97 days.

(21) Appl. No.: 10/316,174

(22) Filed: Dec. 10, 2002

(65) Prior Publication Data
US 2003/0168772 A1    Sep. 11, 2003

Related U.S. Application Data

(60) Provisional application No. 60/362,028, filed on Mar. 5, 2002.

(51) Int. Cl.
*B29C 47/00* (2006.01)
(52) U.S. Cl. .................. 264/211.12; 425/104
(58) Field of Classification Search ............... 425/104, 425/106; 264/209.1, 211.12; 426/85, 86, 426/420, 421, 132; 427/326
See application file for complete search history.

(56) References Cited

U.S. PATENT DOCUMENTS

| | | | |
|---|---|---|---|
| 1,730,638 A * | 10/1929 | Young | |
| 2,867,536 A | 1/1959 | Mead et al. | |
| 3,090,998 A * | 5/1963 | Heisterkamp et al. | |
| 3,615,595 A | 10/1971 | Guttag | ..................... 99/138 R |
| 3,620,770 A | 11/1971 | Harvey | |
| 3,643,727 A * | 2/1972 | Longoni et al. | |
| 3,709,642 A * | 1/1973 | Stannard | |
| 4,750,873 A | 6/1988 | Loe et al. | ..................... 425/71 |
| 4,921,713 A | 5/1990 | Fowler | |
| 5,009,916 A * | 4/1991 | Colliopoulos | ............... 426/615 |
| 5,013,576 A * | 5/1991 | Nakazawa et al. | ........... 426/640 |
| 5,061,510 A * | 10/1991 | Nussbaumer et al. | |
| 5,073,370 A * | 12/1991 | Meer et al. | ................... 424/738 |
| 5,094,861 A | 3/1992 | D'Auguste et al. | |
| 5,296,035 A * | 3/1994 | Chicatelli et al. | |
| 5,422,063 A | 6/1995 | Pelzer | ..................... 264/209.1 |
| 5,618,589 A | 4/1997 | McFarland | .................. 427/482 |
| 5,635,229 A | 6/1997 | Ray | |
| 5,932,262 A | 8/1999 | Little | |
| 6,024,012 A | 2/2000 | Luzenberg, Jr. | |
| 6,045,833 A | 4/2000 | Landau | |
| 6,109,538 A | 8/2000 | Villani et al. | |
| 6,283,294 B1 | 9/2001 | Thorball et al. | |
| 6,599,451 B1 * | 7/2003 | Franke et al. | |

FOREIGN PATENT DOCUMENTS

| | | |
|---|---|---|
| AU | B-32375/97 | 7/1997 |
| EP | 0111188 | 11/1983 |
| FR | 1.484.955 | 5/1967 |
| GB | 863328 | 6/1958 |
| NL | 6708009 | 12/1968 |
| NL | 1013733 | 2/1999 |

* cited by examiner

OTHER PUBLICATIONS

Colorants, F.J. Francis, 1999, Eagan Press, St Paul, MN., DIALOG Abstract.*

*Primary Examiner*—Brenda A. Lamb
(74) *Attorney, Agent, or Firm*—Sutherland Asbill & Brennan LLP (57) ABSTRACT

A coating device for coating an interior surface of a continuous tube of material with a fluid. The coating device includes an extruder die for forming the continuous tube of material and a fluid delivery system. The fluid delivery system is positioned within the extruder die so as to introduce the fluid onto the interior surface of the continuous tube of material.

24 Claims, 6 Drawing Sheets

METHOD AND APPARATUS FOR COATING THE INTERIOR SURFACE OF A STRAW

RELATED APPLICATIONS

This is a non-provisional application claiming priority of U.S. Provisional Application Ser. No. 60/362,028, filed on Mar. 5, 2002.

U.S. Provisional Patent Application Ser. No. 60/432,137, filed herewith, entitled "Method for Producing Acid Coated Drinking Straws and Article", is incorporated herein by reference.

TECHNICAL FIELD

The present invention relates generally to extrusion techniques for polymers and more particularly relates to a method and an apparatus for extruding a polymer straw and coating an interior surface of the straw with a substance.

BACKGROUND OF THE INVENTION

Various types of "flavored" drinking straws are known. By the term "flavored", we mean that an additional substance of some nature has been placed within the drinking straw such that the substance comes into contact with the beverage as the drinker sucks the beverage through the straw. The additional substance may be placed within the straw by various types of inserts, various types of internal coating methods, or various types of external structures that communicate with the interior of the straw.

There are several disadvantages, however, with these known straws. First, the flow of the beverage through the straw may be obstructed when the additional substance is added as part of an internal insert. The insert may cause difficulty or require additional force as the user tries to suck the beverage through the insert. In the case of the interior coating methods, the straw is generally coated after the manufacturing process is complete. This extra coating step, however, may add considerable time and expense to the manufacturing process. Finally, the cost in terms of manufacture and materials is often prohibitive with the use of the known external structures.

What is desired, therefore, is a method and an apparatus for coating the interior surface of a straw with an additional substance. Preferably the method and the apparatus should not materially increase the time of manufacture, increase the cost of manufacture, or decrease the production capacity. Further, the method and the apparatus should coat the additional substance on the interior surface of the straw in a substantially uniform manner.

SUMMARY OF THE INVENTION

The present invention thus provides a coating device for coating an interior surface of a continuous tube of material with a fluid. The coating device includes an extruder die for forming the continuous tube of material and a fluid delivery system. The fluid delivery system is positioned within the extruder die so as to introduce the fluid onto the interior surface of the continuous tube of material.

Specific embodiments include the fluid delivery system having one or more fluid conduits extending through the extruder die. The fluid conduits may include an orifice about a first end. The fluid delivery system may have a flow rate of about 10 to about 500 milliliters per minute.

The coating device further may have an air delivery system. The air delivery system is positioned within the extruder die so as to introduce an air stream within the continuous tube of material. The fluid conduits are positioned within the air delivery system.

The coating device further may include a nozzle positioned within the extruder die. The fluid conduits may be positioned within the nozzle. The nozzle includes a face and the conduits lead to fluid apertures in the face. The fluid conduits may include a central conduit and a number of angled delivery conduits. The angled delivery conduits may include four (4) to eight (8) delivery conduits, diameters of about 0.3 to about 0.6 millimeters, and angles of about ten (10°) to about sixty degrees (60°). The air delivery system includes a number of air conduits within the nozzle leading to a number of air apertures within the face. The air conduits may include a first section parallel to the fluid conduits and a second section angled towards the fluid conduits. The second angled section may have an angle of about ten (10°) to about sixty degrees (60°) and a circular or a square shape. The nozzle also may include a deflector plate attached thereto.

The coating device also may include an electrostatic device positioned in communication with the extruder die. The electrostatic device includes a first charging device surrounding the continuous tube and a second charging device in communication with the fluid delivery system.

A method of the present invention provides for coating the interior surface of a continuous tube of material with a fluid. The method includes the steps of extruding the continuous tube of material through an extruder die, providing a stream of air into the continuous tube of material through the extruder die, and providing a stream of the fluid through the extruder die so as to coat the continuous tube with the fluid.

A further embodiment of the present invention provides a coating device for coating an interior surface of a continuous tube of material with a fluid. The device includes an extruder die for forming the continuous tube of material, a nozzle positioned within the extruder die, a number of air delivery conduits positioned within the nozzle so as to produce an air stream within the continuous tube, and a number of fluid delivery conduits positioned within the nozzle so as to introduce the fluid onto the interior surface of the continuous tube of material.

A further embodiment of the present invention provides a coating device for coating an interior surface of a continuous tube of material with a fluid. The device includes an extruder die for forming the continuous tube of material, an air delivery system positioned within the extruder die so as to produce an air stream, and a fluid delivery system positioned within the air delivery system so as to introduce the fluid and coat the interior surface of the continuous tube of material.

Other features of the invention will become apparent upon review of the following detailed description of the invention when taken in consideration with the drawings and the appended claims.

DETAILED DESCRIPTION

Figure 1:
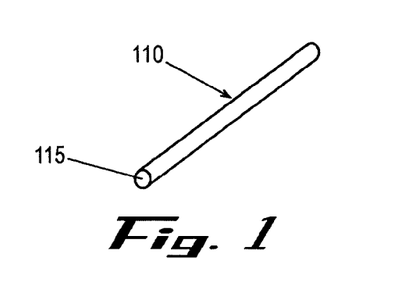
FIG. 1 is a perspective view of a straw.

Referring now to the drawings, in which like numerals refer to like elements throughout the several views, the figures show a straw apparatus 100 for use with the present invention. The straw apparatus 100 may manufacture a typical straw 110. As is shown in FIG. 1, the straw 110 may be made out of a polymer such as polypropylene or similar types of materials. The straw 110 has an interior wall surface 115. The straw 110 may be a conventional elongated tube, a "U"-shaped straw with a crimp towards one end so as to permit bending, a telescoping straw, or any other type of conventional design. If the straw 110 is used with a typical juice box, a pouch, or a fountain drink, the straw 110 may have a wall thickness of about 0.2 to 0.4 millimeters and an inside diameter of about three (3) to four (4) millimeters. Any desired thickness or diameter, however, may be used. The straw 110 also may have any desired length.

The Straw Apparatus

Figure 2:
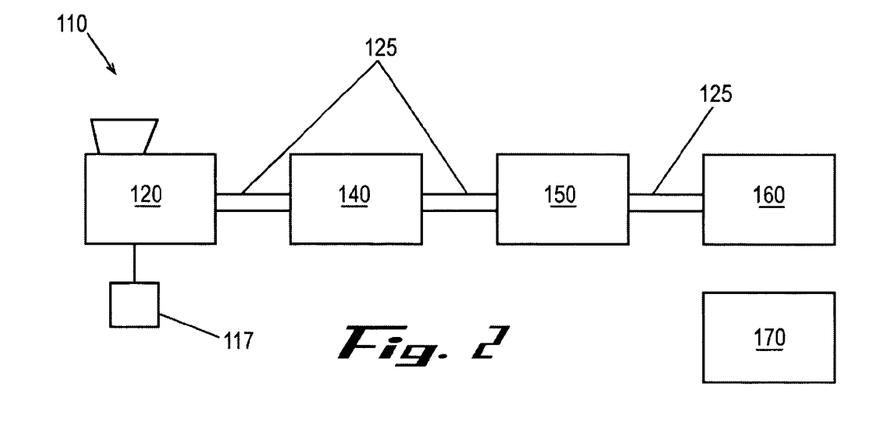
FIG. 2 is schematic view of a straw extrusion process for use with the present invention.

As is shown in FIG. 2, the straw apparatus 100 may include a number of elements or stations so as to produce the straw 110. Operation of the elements or the stations of the straw apparatus 100 may be controlled and monitored by a controller 117. The straw apparatus 100 may include an extruder 120. The extruder 120 may be largely of conventional design. The components within the extruder 120 will be described in more detail below. In general, the extruder 120 takes pellets or other forms of a polymer or a similar material and processes the material into a fluid stream such that the material may be shaped as desired. The extruder 120 may produce about 10,000 to 100,000 straws 110 per hour.

In the case of the straw 110, the extruder 120 generally produces a continuous tube 125 of the polymer material. The continuous tube 125 of the polymer material may extend out of the extruder 120. By way of example, the continuous tube 125 may have a diameter of about six (6) to about ten (10) millimeters and a thickness of about 0.4 to about one (1) millimeters as the tube 125 exits the extruder 120.

The continuous tube 125 may extend from the extruder 120 through an adjacent cooling trough 140. The cooling trough 140 may extend for several meters in length. The cooling trough 140 may be made out of any desired material. The cooling trough 140 may contain water or any other type of fluids or other substances so as to chill the continuous tube 125. For example, if the continuous tube 125 of the polymer material exits the extruder 120 at about 140 to 175 degrees Celsius, the continuous tube 125 may be lowered in temperature by the time it reaches the end of the cooling trough 140 to about twenty (20) to about forty (40) degrees Celsius. The drop in the temperature may vary upon the temperature of the water or other cooling medium, the length of the cooling trough 140, the extrusion flow rate, and the nature of the polymer material.

The continuous tube 125 may extend through the cooling trough 140 to a stretching device 150. The stretching device 150 may be of conventional design. The stretching device 150 may be pulley driven or driven by a conventional drive means. The stretching device 150 may pull on the continuous tube 125 of the polymer material and stretch it such that the wall thickness of the continuous tube 125 may be reduced from about one (1) millimeter to about 0.2 to 0.4 millimeters. This results in reducing the outside diameter of the continuous tube 125 to about three (3) to four (4) millimeters. Any desired diameter or wall thickness, however, may be used. The stretching device may be positioned elsewhere within the straw device 100.

The continuous tube 125 of the polymer material then may extend out of the stretching device 150 and towards a cutting device 160. The cutting device 160 may be of conventional design. The cutting device 160 may cut the continuous tube 125 of the polymer material into the individual straws 110 of any desired length.

Each individual straw 110 may then be further processed as desired. For example, the straw 110 may enter a corrugation machine 170. The corrugation machine 170 may be of conventional design. The corrugation machine 170 may score one end of the straw 110 so as to produce a "U"-shaped straw. The straw 110 then may be wrapped and/or packed as appropriate and shipped to the consumer or other end user.

The Extruder

Figure 3:
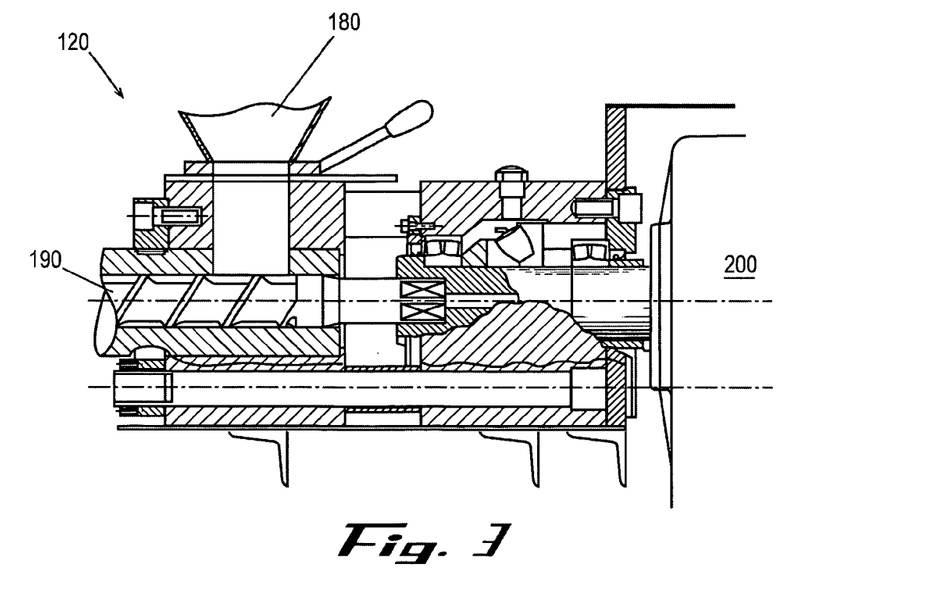
FIG. 3 is a side cross-sectional view of a hopper and a screw of an extruder.
Figure 4:
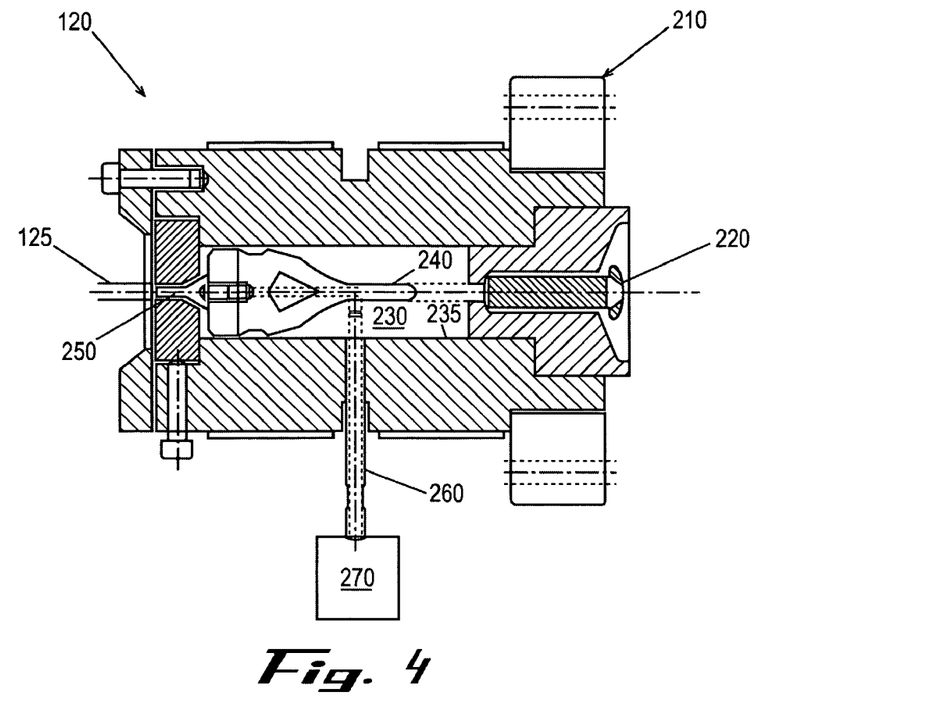
FIG. 4 a side cross-sectional view of an extruder head.

FIGS. 3 and 4 show the internal workings of the extruder 120. As is well known, the extruder 120 may include a hopper 180. The pellets or other forms of the polymer material may be loaded in the hopper 180. The hopper 180 may lead to a screw 190. The screw 190 may be of conventional design. The screw 190 may be driven by a drive system 200. The drive system 200 may be of conventional design. The polymer material may be heated and ground by the screw 190 into a molten polymer stream. The hopper 180, the screw 190, the drive system 200, and the other elements of the extruder 120 may have any desired size or configuration.

Positioned adjacent to the screw 190 may be an extruder head 210. The extruder head 210 may include a mixer 220. The mixer 220 may be of conventional design. The mixer 220 may rotate so as to mix the molten polymer stream. Positioned adjacent to the mixer 220 may be a bore 230. An outer wall 235 may define the bore 230. The bore 230 may have any desired size or shape. A separator 240 may be positioned within the bore 230. The separator 240 may have any desired size or shape. The separator 240 separates the molten polymer stream such that the molten polymer stream is forced between the wall 235 of the bore 230 and the separator 240. The separator 240 thus starts to form the molten polymer stream into the continuous tube 125.

Positioned adjacent to the separator 240 may be an extruder die 250. The extruder die 250 may be of conventional design. The extruder die 250 forces the molten polymer stream into the desired shape. In this example, the extruder die 250 may be largely cone shaped and may force the molten polymer stream into the continuous tube 125 of the polymer material with the desired dimensions.

The extruder head 210 also may include an air conduit 260. The air conduit 260 may define an airflow path from outside the extruder 120 into and through the extruder separator 240 and the extruder die 250. The air conduit 260 may end about with the extruder die 250. The air conduit 260 may be made out of steel or similar types of materials. The air conduit 260 may allow a flow of air 265 into the continuous tube 125 of the polymer material as the tube 125 exits the extruder 120. The air flow may assist in maintaining the interior shape of the continuous tube 125.

Although the air conduit 260 generally may have an inside diameter of about two (2) millimeters for most extruders, an inside diameter of about 1.6 or 1.8 millimeters may be used herein at least at the end of the conduit 260. The smaller inside diameter may provide for the increased air flow and the pressure desired for atomizing the fluid as described below. Any desired diameter, however, may be used.

The air conduit 260 may be attached to a source of pressurized air 270. Air or other gases such as nitrogen, helium, or mixtures thereof also may be used. The air source 270 may be of conventional design. The air source 270 may provide the flow of air 265 through the air conduit 260 at any desired pressure. The air pressure may range from about 0.35 kilogram per square centimeter ($kg/cm^2$) to about 3.5 $kg/cm^2$ (about five (5) to about fifty (50) pounds per square inch (psi)). The flow rate of the air flow 265 may be about 5,663 to about 142,000 milliliters per minute (about 0.2 to about five (5) standard cubic feet per minute (scfm)). Any desire flow rate may be used.

Fluid Delivery System

Figure 5:
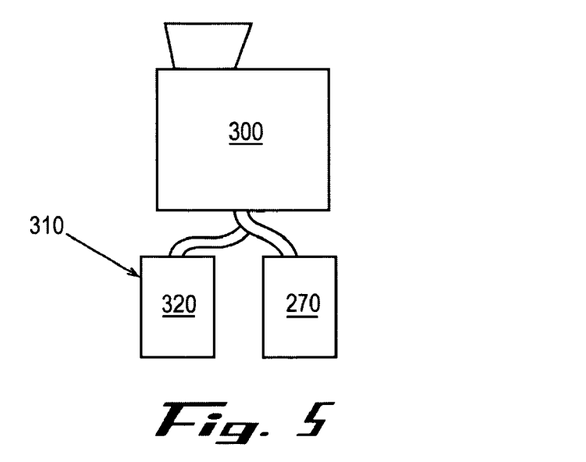
FIG. 5 is a schematic view of the extruder of the present invention.
Figure 6:
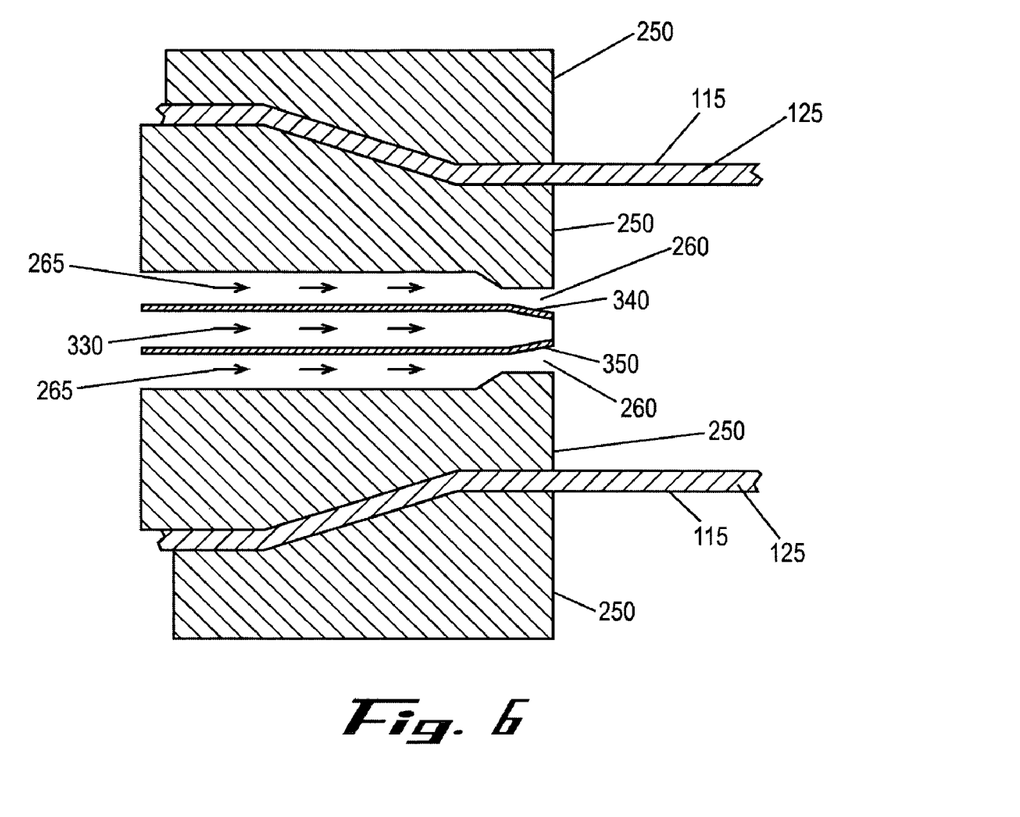
FIG. 6 is a side cross-sectional view of an extruder die of the present invention.

FIGS. 5 and 6 show an extruder 300 of the present invention. The extruder 300 may be substantially identical to the extruder 120 described in detail above. The extruder 300, however, also may include a fluid delivery system 310. The fluid delivery system 310 may include a source of a fluid 320. The fluid source 320 may be a pressurized container of conventional design. Alternatively, the fluid source 320 also may depend on a pump, gravity feed, or a siphoning action. One or more heat sources also may be used.

The fluid source 320 may include a fluid 330 to be applied to the interior wall surface 115 of the straw 110. The fluid 330 may contain a flavoring agent, such as citric acid; a coloring agent; a source of carbonation; any type of nutrient; any type of product additive; a preservative; or any other type of fluid or combination thereof. The fluid 330 may include a measure of a surfactant so as to act as a wetting agent. The surfactant may include lecithin or similar types of materials. The fluid 330 also may include an adhesive agent such as a gum to aid in the "stickiness" of the fluid 330 with respect to the internal wall surface 115 of the continuous tube 125. The gum may include maltodextrin, alginate, or similar types of materials. A plasticizer also may be used. The fluid 330 may be heated to provide a uniform flow. The scope of the invention is not limited by the nature of the fluid 330.

The fluid source 320 may be connected to the extruder head 210 via a fluid conduit 340. The fluid conduit 340 may be made out of steel, stainless steel, plastic materials, or similar types of materials. The fluid conduit 340 may extend into and through the extruder head 210 within the air conduit 260. Alternatively, the fluid conduit 340 and the air conduit 260 may be separate passageways for part or substantially all of their lengths. The fluid conduit 340 may end at about the same location or point where the air conduit 260 ends. The fluid conduit 340 may have a restricted orifice 350 at one end so as to increase the pressure of the fluid 330 therein. Given an air conduit 260 with an inside diameter of about 1.6 or 1.8 millimeters, the orifice 350 may have an outside diameter of about one (1) to about 1.2 millimeters and an inside diameter of about 0.3 to about 0.8 millimeters.

As the fluid 330 exits the restricted orifice 350, the fluid 330 may mix with the air flow 265 exiting the air conduit 260. The flow of the air 265 may largely atomize the flow of the fluid 330 so as to form a spray or a mist. The fluid 330 may have a pressure of about 0.2 to about 10.5 $kg/cm^2$ (about three (3) to 150 psi) and a flow rate of about 10 to about 1,000 milliliters per minute. Any desired pressure or flow rate may be used. Modifications in the air pressure and flow rate may impact on the fluid pressure and flow rate as well as the atomization of the fluid 330.

In Use

In use, the extruder 300 cooperates with the other elements of the straw apparatus 100 as is described above so as to turn the pellets of the polymer material into the continuous tube 125 and the straw 110. As the continuous tube 125 of the polymer material exits the extruder head 210 of the extruder 300, the fluid delivery system 310 delivers a stream of the fluid 330 through the orifice 350 of the fluid conduit 340. The fluid 330 then may be mixed with the air flow 265 from the air source 270 and the air conduit 260. The fluid 330 is preferably atomized within the flow of air 265 and extends down the continuous tube 125 in a spray or a mist.

Figure 7:
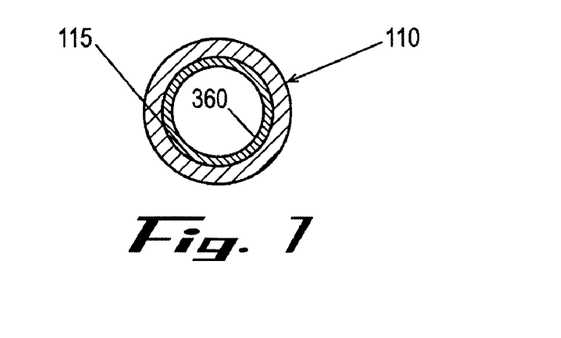
FIG. 7 is a cross-sectional view of a straw as coated.

Based upon flow rates, surface energy, surface tension, particle size, and/or temperature differences, the atomized fluid 330 may coat the interior wall surface 115 of the continuous tube 125 of the polymer material. As is shown in FIG. 7, the fluid 330 may form a substantially uniform coating 360 along the continuous tube 125. This coating 360 should bind to the interior wall surface 115 of the continuous tube 125 as the atomized fluid 330 dries (cures) and the tube 125 cools in the cooling trough 140 and beyond.

By way of example, a straw 110 used with a typical pouch or box drink may have a length of about 135 to about 160 millimeters, with an internal diameter of about two (2) to about five (5) millimeters (about three (3) to about four (4) millimeters used for this example) and a thickness of about 0.2 millimeters to 0.4 millimeters. The beverage may have an acid content of about 0.4 percent by weight. It may be desired to increase the acid content of the beverage to about 1.2 percent for the first five (5) sips or so of the beverage. If each sip contains about seven (7) milliliters of the beverage, the amount of citric acid originally in the first thirty-five (35) milliliters would be about 0.14 grams (by dry weight).

To increase the acid content to about 1.2 percent, we would need to add about another 0.28 grams of citric acid to the straw 110. Assuming one hundred percent (100%) recovery, 0.28 grams of the citric acid may be needed per straw 110. The fluid 330 thus may have a citric acid solution of about five (5%) to about ninety-nine percent (99%) depending on the volume required, water solubility, viscosity, melting temperature, particle size, dripping, and the pumping capability (flow rate and pressure) of the fluid delivery system 310 and the air source 270. If the fluid 330 has a ninety percent (90%) citric acid solution, about 0.31 grams of the fluid 330 should be used.

In this example, the air conduit 260 may have an inner diameter of about 1.6 millimeters and the air source 270 may deliver the flow of air 265 with a pressure of about 1.4 $kg/cm^2$ (about twenty (20) psi) and a flow rate of about 1700 milliliters per minute (about 0.6 scfm). The orifice 350 may have an outer diameter of about 1.2 millimeters and an inner diameter of about 0.4 millimeters. The fluid source 320 may deliver the fluid 330 with a pressure of about 1.8 kg/cm$^2$ (about twenty-five (25) psi) and a flow rate of about two hundred (200) to about three hundred (300) milliliters per minute. The continuous tube 125 may exit the extruder die 250 at about 150 degrees Celsius and may be traveling at about 350 centimeters per second.

Once the fluid delivery system 310 has delivered the fluid 330 to the inner wall surface 115 of the continuous tube 125 of the polymer material and the fluid 330 dries, the coating 360 of about 0.3 grams may remain along the length of the straw 110. The coating 360 becomes bound to the continuous tube 125 as the polymer material cools.

Electrostatic Device

Figure 8:
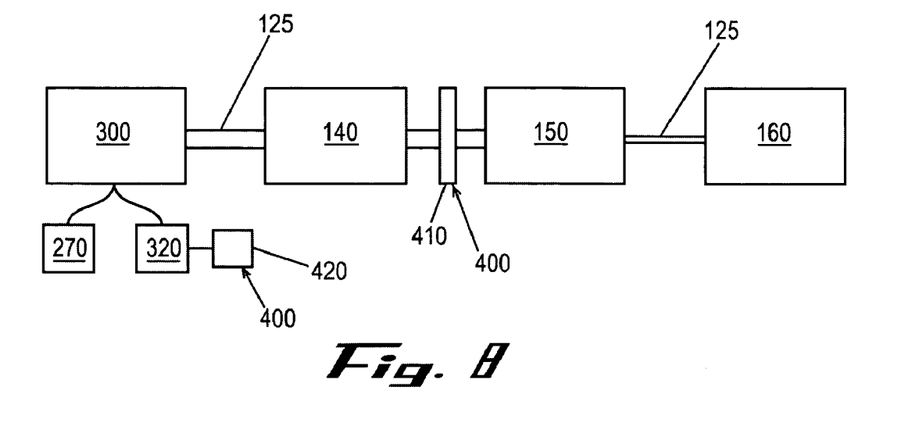
FIG. 8 is a schematic view of an alternative embodiment of the present invention using an electrostatic device.

FIG. 8 shows an alternative embodiment of the present invention. This embodiment involves the use of an electrostatic device 400. The electrostatic device 400 may be of conventional design. The electrostatic device 400 may be used with the straw apparatus 100 as described above. The electrostatic device 400 may include a charging device 410. The charging device 410 may be an electrically conducting conduit positioned on either side of the cooling trough 140 or elsewhere along the path of the straw apparatus 100. The charging device 410 may encircle the continuous tube 125 of the polymer material. The electrostatic device 400 also may include an opposite charging device 420. The opposite charging device 420 may be positioned about the fluid 330 and the fluid source 320. The opposite charging device 420 may charge the fluid 330 with an opposite charge to that of the charging device 110. As such, when the fluid 330 extends through the restricted orifice 350, the charge of the fluid 330 and the charge of the charging device 410 encircling the continuous tube 125 of the polymer material attract each other such that the fluid 330 binds to the interior wall surface 115 of the straw 110 so as to form the uniform coating 360.

Nozzle Design

FIGS. 9 through 15 show further alternative embodiments of the present invention. In these embodiments, the extruder head 210 may include a nozzle 500 instead of or in addition to the orifice 350. The nozzle 500 may communicate with the air conduit 260 and the fluid conduit 340. The nozzle 500 may be made out of steel, stainless steel, plastic materials, or similar types of materials. The nozzle 500 may have a face 510 with a number of apertures 520 therethrough. Each nozzle 500 also may include an extended body portion 530 with a number of conduits 540 therein. The nozzle 500 may be about thirty (30) to about sixty (60) millimeters in length depending upon the size of the extruder head 210. The number, size, positioning, and angle of the apertures 520 may vary depending upon the nature of the fluid 330 and/or other variables as described in more detail herein.

Figure 9:
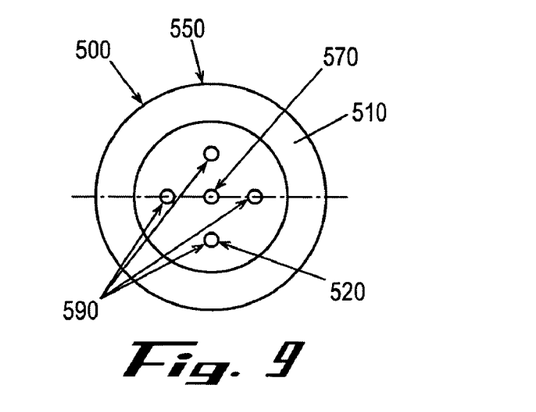
FIG. 9 is a plan view of a nozzle for use with the present invention.
Figure 10:
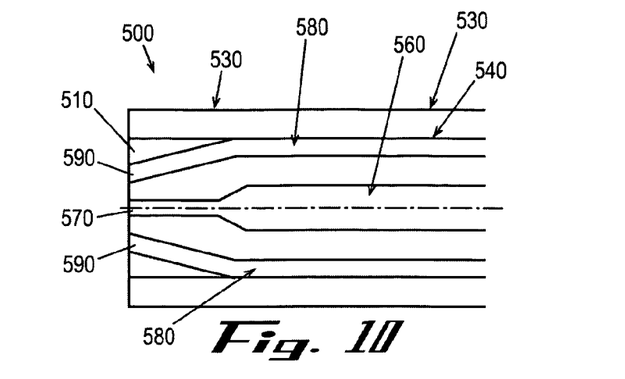
FIG. 10 is a side cross-sectional view of the nozzle of FIG. 9.

For example, FIGS. 9 and 10 show one embodiment of the nozzle 500, in this case a low loading application nozzle 550. The low loading application nozzle 550 may have an internal fluid conduit 560. The internal fluid conduit 560 may be in communication with the fluid conduit 340 described above. The internal fluid conduit 560 may be about thirty (30) to about sixty (60) millimeters in length. The internal fluid conduit 560 also may be in communication with a fluid aperture 570 on the face 510 of the nozzle 550. The internal fluid conduit 560 may have an inside diameter of about 0.1 to about three (3) millimeters. The diameter may narrow as the conduit 560 extends towards the face 510 such that the stream of the fluid 330 exits the aperture 570 under pressure. The fluid aperture 570 may have an inside diameter of about 0.1 to about 0.6 millimeters. The conduit 560 and the aperture 570 may be circular, square, or have any convenient shape.

Surrounding the internal fluid conduit 560 may be a number of internal air conduits 580. The internal air conduits 580 may be enclosed structures or chambers defined by a number of splines. The internal air conduits 580 may be in communication with the air conduit 260 described above. The internal air conduits 580 may be about thirty (30) to about sixty (60) millimeters in length. The internal air conduits 580 also may be in communication with a number of air apertures 590 positioned on the face 510 of the nozzle 550. The internal air conduits 580 may have an inside diameter of about 0.2 to about 0.8 millimeters. The air apertures 590 may have a similar internal diameter. The conduits 580 and the apertures 590 may be circular, square, or have any convenient shape.

The internal air conduits 580 may extend in a largely parallel direction with the internal fluid conduit 560 until about seventy (70) to about 120 millimeters from the face 510. The internal air conduits 580 then may continue in a largely parallel direction with the fluid conduit 560 towards the air apertures 590 or the air conduits 580 may angle downward towards the fluid aperture 570. The angle of the air conduits 580 towards the internal fluid conduit may be about ten (10°) to about sixty degrees (60°) from the horizon. The air apertures 590 may have a similar internal angle. In this example, four (4) air conduits 580 and four (4) air apertures 590 are used. Any number, size, angle, or positioning of the conduits 580 and the apertures 590, however, may be used.

The air conduits 580 and apertures 590 may be used for lower flow rate application, i.e., a flow rate of about ten (10) to about (100) milliliters per minute. The conduits 580 and apertures 590 may be angled such that the air flow intersects the stream of fluid 330 as it leaves the fluid aperture 570. The air conduits 580 and the air apertures 590 allow the air flow to atomize the stream of fluid 330. Low flow applications may include color, flavor, etc. where atomizing or misting of the fluid 330 is sufficient to apply the fluid 330 to the continuous tube 125. The eventual drying of the water within the fluid 330 produces the dry coated straws 110.

For example, the internal fluid conduit 560 and the fluid aperture 570 may have a diameter of about 0.3 millimeters. The air conduits 580 and the air apertures 590 may have a diameter of about 0.6 millimeters. The fluid 330 may include blue dye, deionized water, glycerin, monoglyceride, and sodium alginate. The fluid 330 may have a flow rate of about 25 milliliters per minute at a pressure of about 3.5 kg/$cm^2$ (about 50 psi). The air flow may have a flow rate of about 28,000 milliliters per minute at a pressure of about 1.4 kg/$cm^2$ (about 20 psi). The fluid 330 thus may coat the inner wall surface 115 of the continuous tube 125 with about twenty-five (25) milligrams of the coating 360 along the length of a straw 110 about 150 millimeters long.

FIGS. 11 and 12 show a further embodiment of the nozzle 500, in this case a high load application nozzle 600. The high load application nozzle 600 also may include an internal fluid conduit 610. The internal fluid conduit 610 may be in communication with the fluid conduit 340 described above. The internal fluid conduit 610 may be about thirty (30) to about sixty (60) millimeters in length and may have an inside diameter of about 0.3 to about three (3) millimeters. The internal fluid conduit 610 may split into a number of angled delivery conduits 620. Each angled delivery conduit 620 may be about 0.5 to about four (4) millimeters in length and may have an inside diameter of about 0.3 to about 0.6 millimeters. Although four (4) angled delivery conduits 620 are used in this embodiment, any number of conduits 620 may be used. The number of the conduits 620 used may vary with the diameter of each conduit 620. The angle of the delivery conduits 620 may be between about ten (10°) and sixty degrees (60°) off of the center of the internal fluid conduit 610.

Figure 11:
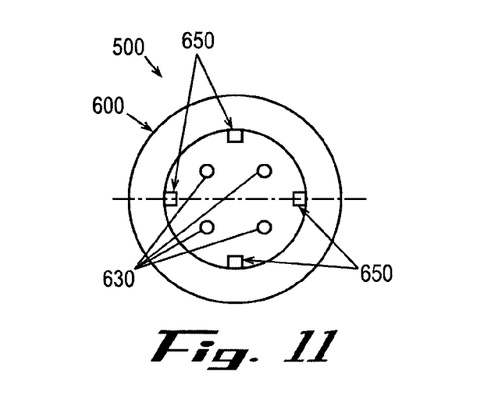
FIG. 11 is a plan view of an alternative embodiment of a nozzle for use with the present invention.
Figure 12:
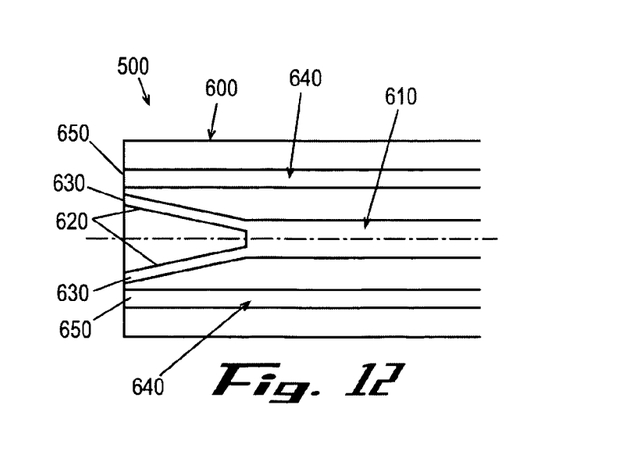
FIG. 12 is a side cross-sectional view of the nozzle of FIG. 11

Each angled delivery conduit 620 may communicate with a fluid aperture 630 positioned within the face 510. Each fluid aperture 630 may have about the same internal angle and size as the accompanying delivery conduit 620. The delivery conduit 620 and the aperture 630 may direct a flow of the fluid 330 towards the walls of the continuous tube 125 at the given angle. The conduits 620 and the apertures 630 may be circular, square, or have any convenient shape. One or more circular or semicircular slits also may be used instead of the multiple fluid apertures 630. The slits may be about 0.2 to about 0.5 millimeters wide and angled at about ten (10°) to about sixty degrees (60°) off of the center of the internal fluid conduit 610. Other shapes also may be used.

Surrounding the internal fluid conduit 610 and the angled delivery conduits 620 may be one or more internal air conduits 640. The internal air conduits 640 each may have a diameter of about 0.2 to about 0.8 millimeters and may be about thirty (30) to about sixty (60) millimeters in length. The internal air conduits 640 may be in communication with the air conduit 260 described above. The internal air conduits 640 may lead to a number of air apertures 650 on the face 510. The air conduits 640 and the air apertures 650 may be circular, square, or have any convenient shape. The air conduits 640 and the air apertures 650 also may be angled. Any number of air conduits 640 and air apertures 650 may be used. Certain application may not require the use of the air conduits 640 and the apertures 650.

The angled delivery conduits 620 and/or the internal air conduits 640 also may extend beyond the face 510 by about five (5) to ten (10) millimeters or so. Other distances also may be used. Likewise, the face 510, the conduits 620, 640, and the apertures 630, 650 may terminate before the end of the extruder head 210. Different flow patterns and coatings 360 may be provided by varying the positioning of these elements.

As described above, the number, size, and angle of the fluid apertures 570, 630 may be varied. In the example of FIGS. 11 and 12, four (4) angled delivery conduits 620 and four (4) fluid apertures 630 may be used. The conduits 620 and the apertures 630 may have a diameter of about 0.6 millimeters and may extend about thirty degree (30°) from the center of the internal fluid conduit 610.

Figure 13:
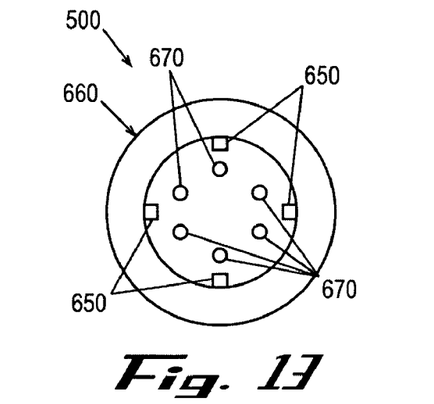
FIG. 13 is a plan view of an alternative embodiment of a nozzle for use with the present invention.

FIG. 13 shows a further nozzle 660. The nozzle 660 is similar to the high load application nozzle 600, but has six (6) fluid apertures 670 and six (6) angled delivery conduits 620. The apertures 670 and the conduits 620 may be positioned about ten (10°) to about thirty degrees (30°) off of the center of the internal fluid conduit 610. The apertures 670 and conduits 620 may have an internal diameter of about 0.5 millimeters.

Figure 14:
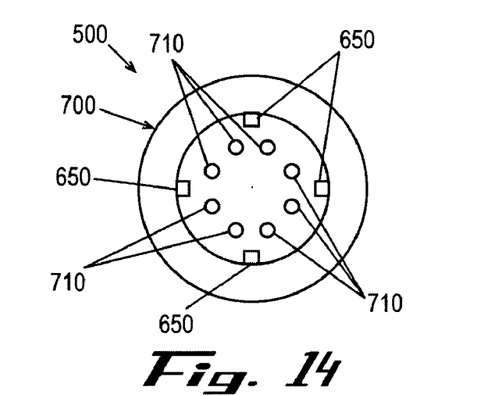
FIG. 14 is a plan view of an alternative embodiment of a nozzle for use with the present invention.

FIG. 14 shows a further nozzle 700. The nozzle 700 is similar to the high load application nozzle 600, but with eight (8) fluid apertures 710. The fluid apertures 710 may be fed by eight (8) angled delivery conduits 620. The delivery conduits 620 may be angled at about ten (10°) to about thirty degrees (30°) off of the center of the internal fluid conduit 610. The apertures 710 and the conduits 620 each have an inside diameter of about 0.4 millimeters.

As is seen in the figures above, the size of each aperture 630, 670, 710 and each conduit 620 may vary according to the number of apertures 630, 670, 710 and conduits 620 used. The more apertures 630, 670, 710 and conduits 620 used, the smaller the apertures 630, 670, 710 and the conduits 620 may be. Likewise, the angle and positioning of the apertures 630, 670, 710 and the conduits 620 may vary with size. The number, size, and angle of the air conduits 640 and air apertures 650 also may be varied.

The high load application nozzle 600 may be utilized for high flow applications where evaporating water from the flow of the fluid 330 may not be possible, i.e., about fifty (50) to about 1,000 milliliters per minute. This application may use a coating formulation that solidifies as soon as the continuous tube 125 and the fluid 330 exit the extruder head 210. This solidification, setting, or jelling of the fluid 330 may occur by means of rapid cooling, chemical formation, or by curing. It is understood that the term "fluid 330" may refer to a fluid, a particle slurry, a fluid/solid slurry, an emulsion, a fluid/gas/solid slurry, or any other type of flowable material. Specific possible fluids 330 and the delivery thereof are explained in further detail in U.S. Provisional Patent Application Ser. No. 60/432,137, described above and incorporated herein by reference. The nozzle 600 thus may be utilized for applications such as acid coating where large amounts of a coating ingredient may be required or desired in the end product.

For example, six (6) angled delivery conduits 620 and six (6) apertures 630 each may have a diameter of about 0.5 millimeters. The conduits 620 and the apertures 630 may have an angle of about fifteen (15) degrees. Four (4) internal air conduits 640 and four (4) air apertures 650 each may have a diameter of about 0.5 millimeters. The fluid 330 may include citric acid anhydrous and/or phosphoric acid, deionized water, glycerin, and monoglyceride. The fluid 330 may have a flow rate of about 300 milliliters per minute at a pressure of about 1.4 kg/cm$^2$ (about 20 psi). The air flow may have a flow rate of about 7000 milliliters per minute at a pressure of about 0.35 kg/cm$^2$ (about five (5) psi). The fluid 330 thus may coat the inner wall surface 115 of the continuous tube 125 with about 350 milligrams of the coating 360 along the length of each straw 110.

Figure 15:
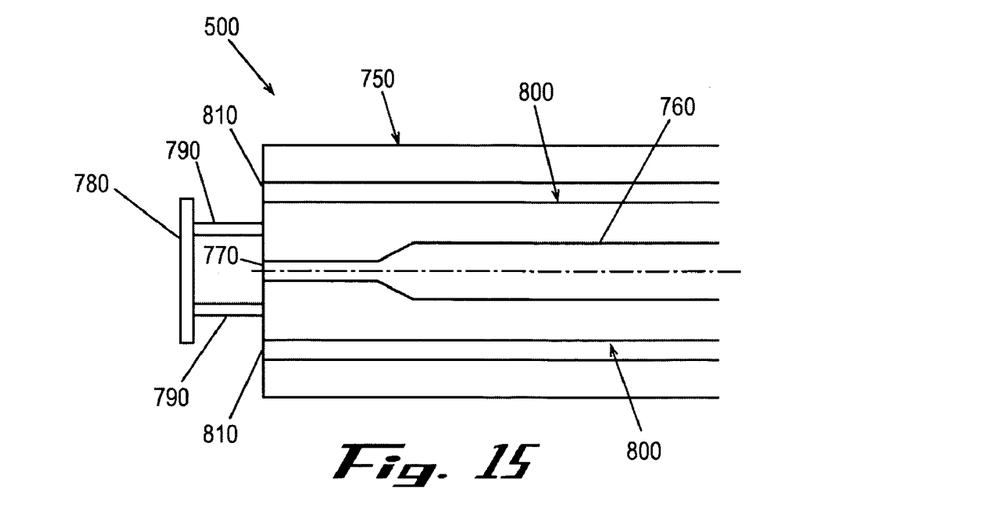
FIG. 15 is a side cross-section view of an alternative embodiment of a nozzle for use with the present invention.

FIG. 15 shows a further embodiment of the present invention, a nozzle 750. The nozzle 750 may include an internal fluid conduit 760 and a fluid aperture 770. The nozzle 750 also further may include a deflector plate 780 attached to the face 510 via a number of prongs 790. The deflector plate 780 may be spaced from the face 510 by a sufficient distance such that the fluid exiting the fluid aperture 770 may strike the deflector plate 780 and spray uniformly onto the inner surface of the continuous tube 125. The deflector plate 780 may be about one (1) to about four (4) millimeters in diameter. The deflector plate 780 may be positioned about two (2) to about twenty (20) millimeters away from the face 510. The positioning of the deflector plate 760 may vary with the flow rate of the fluid 330.

A number of internal air conduits 800 and accompanying air apertures 810 also may be present. The air conduits 800 and the apertures 810, however, may not be needed. The angled delivery conduits 620 also may be used with a number of the fluid apertures 630 as is shown in FIGS. 11 and 12.

It should be apparent that the foregoing relates only to the preferred embodiments of the present invention and that numerous changes and modifications may be made herein without departing from the spirit and scope of the invention as defined by the following claims and the equivalents thereof.

We claim:

1. A coating system, comprising:

a continuous tube of drinking straw material;
an extruder die for forming the continuous tube of drinking straw material; and
a beverage additive fluid delivery system with a source of a beverage additive fluid;
said beverage additive fluid delivery system positioned within said extruder die so as to introduce the beverage additive fluid onto an interior surface of the continuous tube of drinking straw material.

2. The coating device of claim 1, wherein said beverage additive fluid delivery system comprises one or more fluid conduits extending through said extruder die.

3. The coating device of claim 2, wherein said one or more fluid conduits comprise an orifice about a first end.

4. The coating device of claim 2, further comprising an air delivery system, said air delivery system positioned within said extruder die so as to introduce an air stream within the continuous tube of drinking straw material.

5. The coating device of claim 4, wherein said one or more fluid conduits are positioned within said air delivery system.

6. The coating device of claim 4, further comprising a nozzle positioned within said extruder die.

7. The coating device of claim 6, wherein said one or more fluid conduits are positioned within said nozzle.

8. The coating device of claim 7, wherein said nozzle comprises a face and wherein said one or more fluid conduits lead to one or more fluid apertures in said face.

9. The coating device of claim 7, wherein said one or more fluid conduits comprise a central conduit and a plurality of angled delivery conduits.

10. The coating device of claim 9, wherein said plurality of angled delivery conduits comprises four (4) to eight (8) delivery conduits.

11. The coating device of claim 9, wherein said plurality of angled delivery conduits comprises a diameter of about 0.3 to about 0.6 millimeters.

12. The coating device of claim 9, wherein said plurality of angled delivery conduits comprises an angle of about ten (10°) to about sixty degrees (60°).

13. The coating device of claim 6, wherein said air delivery system comprises a plurality of air conduits within said nozzle leading to a plurality of air apertures within face of said nozzle.

14. The coating device of claim 13, wherein said plurality of air conduits comprises a first section parallel to said one or more fluid conduits.

15. The coating device of claim 14, wherein said plurality of air conduits comprises a second section angled towards said one or more fluid conduits.

16. The coating device of claim 15, wherein said second angled section comprises an angle of about ten (10°) to about sixty degrees (60°).

17. The coating device of claim 13, wherein said plurality of air conduits comprises a circular or a square shape.

18. The coating device of claim 6, wherein said nozzle comprises a deflector plate attached thereto.

19. The coating device of claim 1, wherein said beverage additive fluid delivery system comprises a flow rate of about ten (10) to about five hundred milliliters per minute.

20. The coating device of claim 1, further comprising an electrostatic device positioned in communication with said extruder die.

21. The coating device of claim 20, wherein said electrostatic device comprises a first charging device in communication with the continuous tube of drinking straw material and a second charging device surrounding said beverage additive fluid delivery system.

22. A method for coating the interior surface of a continuous tube of drinking straw material with a beverage additive fluid, comprising:
extruding the continuous tube of drinking straw material through an extruder die;
providing a stream of air into the continuous tube of material through said extruder die; and
providing a stream of the beverage additive fluid through said extruder die so as to coat the continuous tube with the beverage additive fluid.

23. A coating device for coating an interior surface of a continuous tube of material with a fluid, comprising:
an extruder die for forming the continuous tube of material;
a nozzle positioned within said extruder die;
a plurality of air delivery conduits positioned within said nozzle so as to produce an air steam within the continuous tube of material; and
a plurality of fluid delivery conduits positioned within said nozzle so as to introduce the fluid onto the interior surface of the continuous tube of material.

24. A coating system, comprising:
a continuous tube of drinking straw material;
a extruder die for forming the continuous tube of drinking straw material;
an air delivery system;
said air delivery system positioned within said extruder die so as to produce an air stream within the continuous tube of drinking straw material; and
a beverage additive fluid delivery system;
said beverage additive fluid delivery system comprising a beverage additive fluid;
said beverage additive fluid delivery system positioned within said air delivery system so as to introduce the beverage additive fluid into said air stream and coat an interior surface of the continuous tube of drinking straw material.

* * * * *